TUB DIVERTER SPOUT

Original Filed Feb. 6, 1967 2 Sheets-Sheet 1

INVENTOR.
Alfred M. Moen,
By Parker & Carter
Attorneys.

TUB DIVERTER SPOUT

Original Filed Feb. 6, 1967 2 Sheets-Sheet 2

INVENTOR.
Alfred M. Moen,
BY Parker & Carter
Attorneys.

United States Patent Office

Re. 27,819
Reissued Nov. 27, 1973

27,819

TUB DIVERTER SPOUT

Alfred M. Moen, 25 Lakeview Drive,
Grafton, Ohio 44044

Original No. 3,419,914, dated Jan. 7, 1969, Ser. No. 614,197, Feb. 6, 1967. Application for reissue Nov. 26, 1971, Ser. No. 202,708
Int. Cl. E03c *1/01;* F16k *51/00*
U.S. Cl. 4—148 8 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a diverter for use in a combination shower and tub plumbing fixture in which the diverter automatically returns to the tub position when the water is turned off, and in which water pressure, acting on a portion of the diverter, is effective to hold the diverter in the shower position, once it has been moved to this position.

This invention relates to a diverter for the spout associated with a bathtub. It is common, in connection with bathtubs, to have a shower fixture above the tub and it is desirable to provide simple diverting means so that when the water is turned on, it may be directed either to the shower or to the tub.

One object is to provide a diverter associated with a tub spout so that the user, by simple manipulation, may direct the stream of water either to the tube or to the shower fixture.

Another object is to provide a tub spout diverter means which includes a part positioned to be held in sealing relationship with the spout by means of water pressure within the spout.

Another object is a tub spout diverter which automatically returns to the tub position when the water is turned off.

Other objects will appear in the ensuing specification, drawings and claims.

Figure 1:
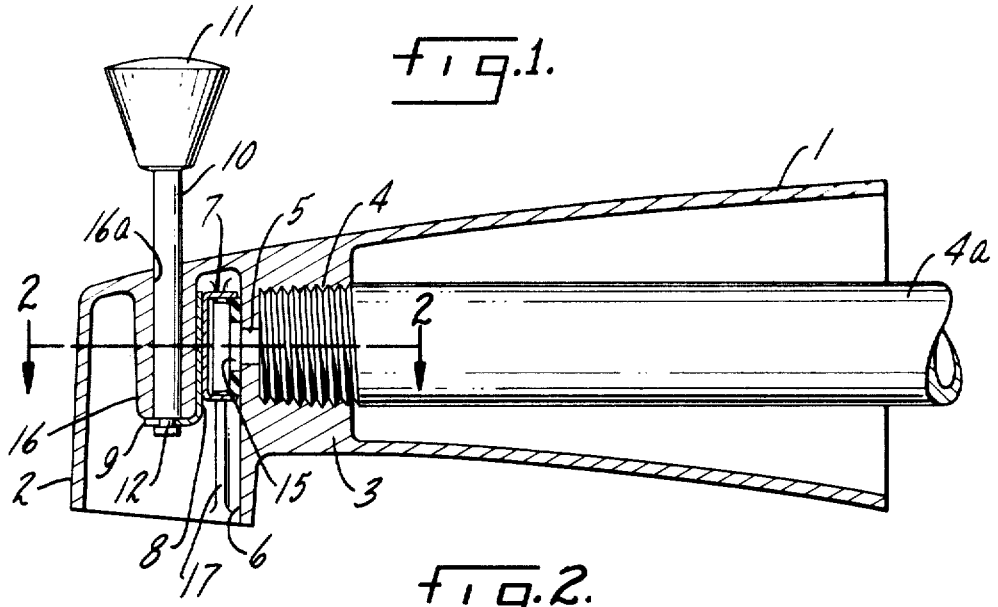
Figure 2:
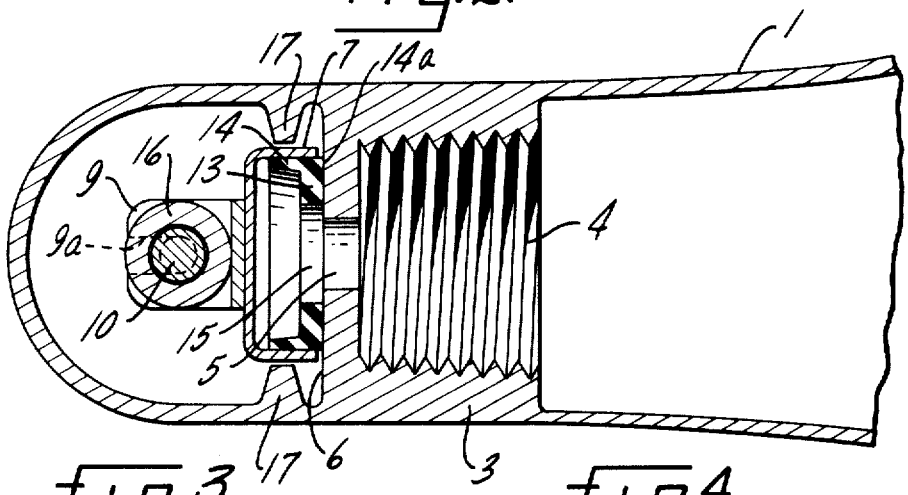
Figure 3:
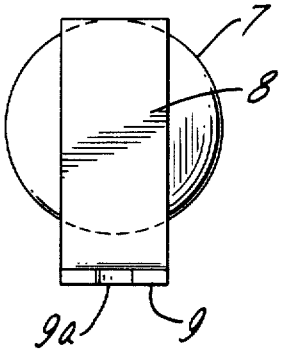
Figure 4:
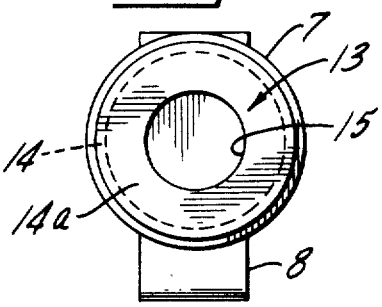
Figure 5:
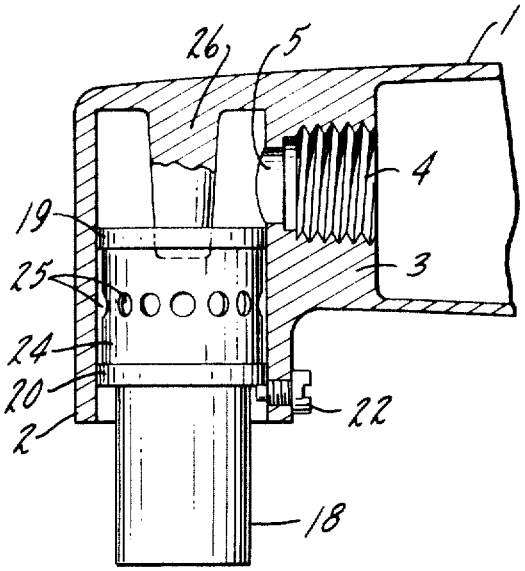
Figure 6:
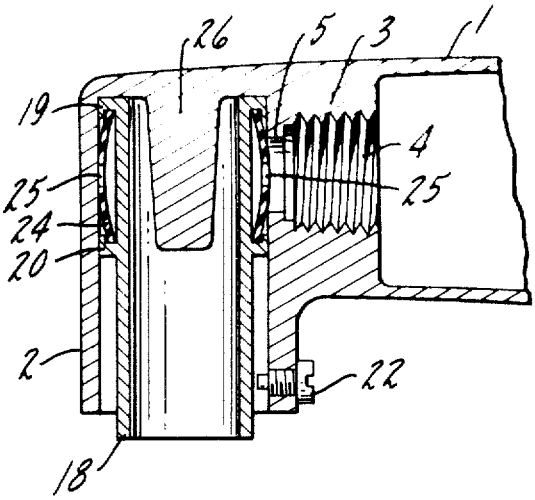
Figure 7:
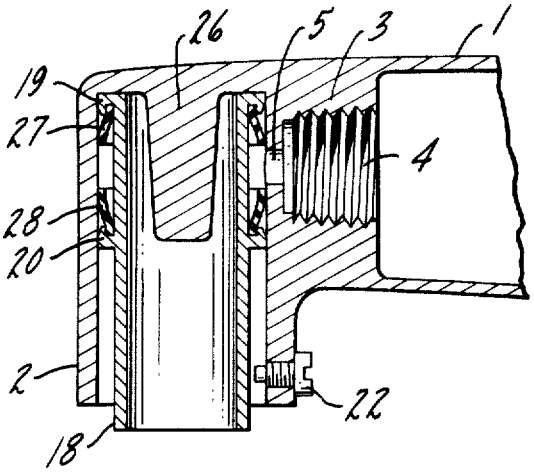
Figure 8:
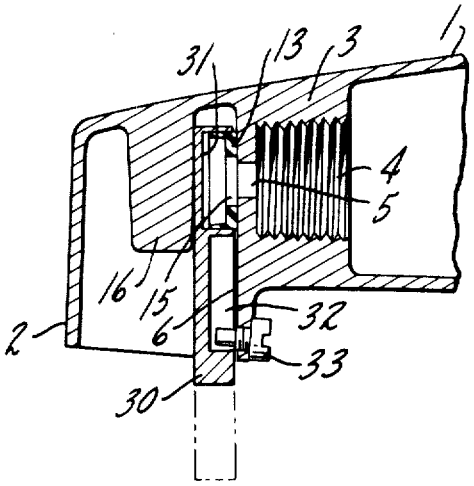

The invention is illustrated diagrammatically in the following drawings wherein:

FIGURE 1 is a vertical section through a tub spout showing one form of diverter, FIGURE 2 is a section along plane 2—2 of FIGURE 1, FIGURE 3 is a front plan view of the diverter cup valve, FIGURE 4 is a rear plan view of the diverter cup valve illustrated in FIGURE 3, FIGURE 5 is a vertical section of a modified form of diverter, FIGURE 6 is a section similar to FIGURE 5, but showing the diverter in the raised position, FIGURE 7 is a section showing a diverter, similar to FIGURES 5 and 6, but with a modified seal, and FIGURE 8 is a vertical section of yet a further form of the invention.

In FIGURE 1, a tub spout 1, suitable for use in connection with a bathtub and intended to be positioned to discharge into a tub, has a downwardly turned discharge portion 2. The spout 1 may have an internal restriction 3, threaded as at 4, and provided with a discharge opening 5, preferably of less diameter than the threaded passage 4. A conventional water supply pipe **4*a* may be received in threaded area 4. A vertical face 6 of the restriction 3 may act as a seating surface against which the diverter valve is seated when in position to close the opening 5**.

The valve, in form shown in FIGURES 1–4, may include a rigid cup-like member 7 having a cup arm 8 which has a laterally bent portion 9 at its lower end. The tub spout may be provided with a downwardly extending boss 16, spaced from the face 6 and having a vertical bore **16*a*. A stem 10 is movable in the bore 16*a* and carries a knob 11 at its upper end. The lower end of the stem may be attached, for example by a loose connection, to the laterally bent portion 9. One such connecting means is a slot 9*a* in the laterally bent portion 9 of the cup arm 8 which receives a reduced portion 12 on the stem 10**.

Within the cup 7 is a flexible cup-like sealing member 13 having a sidewall 14 which is closely fitted within the sidewall portions of the cup 7 so as to retain the sealing member 13 within the cup 7. The cup 13 may be made of a flexible elastic material, such as rubber, and has a face **14*a* which is adapted to seat and seal against the face 6 of the restriction 3. There may be a passage 15 within the cup 13, which passage is in alignment with and larger than the passage 5 in the restriction 3. Thus, water flowing through the threaded passage 4 may flow inside of the cup 13**.

In operation, the cups 7 and 13 will reciprocate in the space between the boss 16 and the face 6 of the restriction 3. There may be a pair of vanes or guides 17 on opposite sides of the cup 7 so as to define a path through which the cups move during reciprocation. The stem 10, and its associated knob 11, are used to move the cups in an up and down direction and, in effect, to change the direction of water flow from the tub to the shower.

When the diverter is in the position of FIGURE 1, water flowing through the threaded passage 4 will flow into the interior of the cups 7 and 13 or into the chamber defined by these two cups. Inasmuch as the passage 15 is smaller in cross section that the area of water pressure application of the cup 13 against the surface 6, water pressure will hold the surface **14*a* of the cup 13 against the sealing surface 6 and thus hold the cups 7 and 13 in the up, or shower, position of FIGURE 1. The diverter must be moved to the position of FIGURE 1, inasmuch as the normal position of the diverter is down, so that water will flow directly to the tub. The diverter will automatically return to this position, once water is shut off, as at that time the weight of the cups and stem will naturally draw the diverter to the down position. However, once the diverter has been moved to the shower position of FIGURE 1, water pressure within the pressure chamber of the diverter, forcing the cup 13 into a sealing relation with the surface 6**, will hold the diverter in an up position.

FIGURE 8 shows a modification of the device illustrated in FIGURE 1. In this instance, the diverter is not operated from a knob above the spout, but may be operated by moving a reciprocal plunger 30. The plunger 30 may have an upper cup-like portion 31, similar to the cup 7 and enclosing a rubber or elastic cup 13, the same as illustrated in FIGURES 1–4. The plunger 30 extends downwardly, below the lower end of the spout, so that it may be manipulated by a person's hand acting from beneath the spout. The plunger 30 may have a groove 32, and there may be a screw or the like 33 extending inwardly through the side of the spout into the groove 32. The combination of the groove 32 and the screw 33 is effective to guide the plunger 30 in its reciprocal movement within the spout.

The operation of the device illlustrated in FIGURE 8 is substantially the same as shown in FIGURE 1, in that the diverter, in this case the plunger 30 and its associated cup 13, will be held in the up, or shower, position by means of water pressure from within the cup. Once the water is turned off, the plunger 30 will return to its lower position, illustrated in dotted lines. Although the boss 16 is again illustrated in FIGURE 8, it may be possible to do away with such a boss, provided there are other means of preventing the first rush of water through the aligned passages 5 and 15 from disturbing the position of the plunger 30.

In FIGURES 5 and 6, the spout, restriction and the threaded passage have all been given the same numbers as in FIGURES 1–4. There may be a downwardly extending boss 26 within the spout, similar to the boss illustrated in FIGURE 8. A plunger, indicated generally at 18, may be reciprocal within the spout and in a path concentric with the downwardly extending boss 26. The plunger 18 is cylindrical in form and may have a pair of spaced annular flanges 19 and 20 which are used to position a sealing member 24, in the form of an annular ring, in a fixed relationship with the plunger. The annular seal 24 may have a plurality of openings or ports 25 which are positioned in alignment with the passage 5 in the restriction 3 when the plunger is in the up position of FIGURE 6. There may be a screw 22 extending through a lower portion of the spout so as to act as a guide for movement of the plunger 18.

In operation, when the diverter is in the up position of FIGURE 6, water flowing through passage 5 will pass through ports 25 to the interior of the seal 24. The outward pressure of the water against the annular seal 24 will hold the plunger 18 in the up position. Again, the plunger may be manipulated from below the spout, much as in FIGURE 8. When the water is turned off, the weight of the plunger 18 will automatically return it to the down or tub position.

The valve shown in FIGURE 7 is substantially the same as that shown in FIGURE 8, except that the seal has been modified. In this case, there are a pair of seals 27 and 28, again held in position by the flanges 19 and 20. The seals may be in the form of lip seals which extend outwardly toward the surface 6 and toward the interior surface of the spout. Water passing through passage 5 will pass between the spaced lip seals 27 and 28 and will flow underneath the seal lips, forcing the lips outwardly so that they will hold the plunger 18 in the up position of FIGURE 7. The annular seals 27 and 28 cooperate to define a pressure chamber in the same manner as the annular seal 24.

The invention should not be limited to the precise configuration of parts illustrated herein. The invention is directed broadly to the idea of a diverter valve assembly, which may be moved either from a knob above the spout, or from below the spout. Essentially the diverter includes a flexible member which is adapted to be forced outwardly into sealing engagement with an internal surface of the spout when the diverter valve is moved to the shower position. The diverter valve will maintain this position until such time as the water is turned off. The flexible sealing member is so proportioned that the water within it applies sufficient sealing pressure to its exterior to hold the diverter in position to block the tub water passage as long as the water stays on.

The spout housing may be mold formed or cast and used with or without a diverter. There is no machining necessary to prepare the spout housing for diverter use. The diverter assembly is merely added to the spout housing as formed.

In all forms of the invention the boss 16 may have a passage for the stem 10. If such a stem is not used or if no diverter is used, the boss passage assists in aerating the water stream. Even when the stem is used the boss passage provides a degree of aeration.

Whereas the preferred form of the invention has been shown and described herein, it should be realized that there are many modifications, substitutions and alterations thereto within the scope of the following claims.

I claim:

[1. In combination, a diverter valve and a spout, said spout having a water inlet and a water outlet and a water passage intermediate said inlet and outlet, said diverter valve including means defining a reciprocal pressure chamber, means in said spout for guiding said reciprocal pressure chamber, said pressure chamber including a sealing portion positioned for sealing engagement with said spout, a passage in said diverter valve communicating with the interior of said chamber and said spout water passage, with said diverter valve passage being smaller in cross sectional area than the sealing portion of said pressure chamber, said pressure chamber being movable from a position in which said pressure chamber is away from said spout water passage to a position in which the diverter valve passage is in alignment with the spout water passage whereby water flowing into said pressure chamber holds said diverter valve in said last-named position to thereby close the water passage in the spout.]

2. The structure of claim [1] *10* further characterized in that said pressure chamber includes a rigid cup, and a flexible sealing member, with said flexible sealing member being positioned for sealing engagement with a portion of the spout.

3. The structure of claim 2 further characterized in that said flexible sealing member has a cup-like configuration.

4. The structure of claim 2 further characterized by and including a boss in said [spout water discharge,] water outlet, a movable stem in said boss, with the lower portion of said stem being fixed to said rigid cup for movement therewith.

5. The structure of claim 2 further characterized by and including manual operating means forming a portion of said rigid cup and extending downwardly below the [spout] discharge *opening* for use in reciprocating said cup-like member.

[6. The structure of claim 1 further characterized by and including a water discharge chamber in said spout, a hollow plunger reciprocal in said water discharge chamber, said plunger having annular flexible means positioned about it, with said flexible means defining said pressure chamber with the plunger, at least one opening in said flexible means whereby water from said spout passage may reach the interior of said flexible means, a portion of said plunger extending downwardly below said spout discharge for use in manipulating the diverter valve.]

7. The structure of claim [6] *10* further characterized in that said flexible means is a continuous annular member having a plurality of water passages.

8. The structure of claim [6] *10* further characterized in that said flexible means includes spaced lip seals, positioned to define an annular water passage between them, such that water may reach the interior of said pressure chamber.

*9. In combination, a diverter valve and a spout, said spout having a water inlet and a water outlet and a water passage intermediate said inlet and outlet,*

*said diverter being positioned within said water outlet and having means defining a reciprocal pressure chamber, means in said spout for guiding said reciprocal pressure chamber, said pressure chamber including a sealing portion for sealing said spout water passage,*

*a passage in said pressure chamber connecting the interior of said pressure chamber and said spout water passage when said pressure chamber is aligned with said spout water passage,*

*said pressure chamber being reciprocally movable from a position in which said pressure chamber is away from said spout water passage to a position in which said pressure chamber passage is connected with said spout water passage whereby water flowing into said*

*pressure chamber holds said pressure chamber in said last-named position to thereby close said spout water passage,*

*a discharge opening in said water outlet, said discharge opening being sized relative to said diverter valve and spaced horizontally relative to said spout water passage to permit installation and removal of said diverter valve relative to said water outlet through said discharge opening, said diverter valve being spaced directly above said discharge opening and reciprocally movable in a path toward or away from said discharge opening.*

*10. The structure of claim 9 further characterized by and including a hollow plunger reciprocal in said water outlet, said plunger having annular flexible means positioned about it, with said flexible means defining said pressure chamber with the plunger, at least one opening in said flexible means whereby water from said spout water passage may reach the interior of said flexible means, a portion of said plunger extending downwardly below said discharge opening for use in manipulating the diverter valve.*

References Cited

The following references, cited by the Examiner, are of record in the patented file of this patent or the original patent.

UNITED STATES PATENTS

| | | | |
|---|---|---|---|
| 3,043,554 | 7/1962 | De La Garza | 251—175 |
| 3,103,948 | 9/1963 | Salmen | 251—175 |
| 3,160,329 | 12/1964 | Radic et al. | 137—525 |
| 2,041,002 | 5/1936 | Kreuzer et al. | 4—148 |
| 3,075,778 | 1/1963 | Baivers et al. | 277—27 |
| 3,387,816 | 6/1968 | Holycross | 251—175 |
| 3,591,134 | 7/1971 | Fudiwara | 251—175 |
| 2,024,930 | 12/1935 | Judell | 4—148 |
| 2,152,868 | 4/1939 | Bucknell et al. | 4—148 |
| 1,166,303 | 12/1915 | Adams | 4—198 |
| 1,666,531 | 4/1928 | Glauber | 4—148 |
| 2,627,872 | 2/1953 | Gruan | 4—191 |
| 2,844,353 | 7/1958 | Gurrias | 251—175 |
| 2,911,185 | 11/1959 | Langdon | 137—525 |
| 2,997,058 | 8/1961 | Hall | 4—148 |
| 3,012,251 | 12/1961 | Fife | 4—192 |

FOREIGN PATENTS

| | | |
|---|---|---|
| 1,259,021 | 3/1961 | France. |
| 314,719 | 2/1934 | Italy. |

HENRY K. ARTIS, Primary Examiner

U.S. Cl. X.R.

4—191; 137—119, 467